United States Patent
Ishii et al.

(10) Patent No.: US 8,273,991 B2
(45) Date of Patent: Sep. 25, 2012

(54) FLUORINE-CONTAINING COPOLYMER AND MOLDED ARTICLE

(75) Inventors: Kenji Ishii, Settsu (JP); Hideki Kono, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 430 days.

(21) Appl. No.: 12/446,052

(22) PCT Filed: Oct. 15, 2007

(86) PCT No.: PCT/JP2007/070079
§ 371 (c)(1),
(2), (4) Date: Apr. 17, 2009

(87) PCT Pub. No.: WO2008/047759
PCT Pub. Date: Apr. 24, 2008

(65) Prior Publication Data
US 2010/0212929 A1    Aug. 26, 2010

(30) Foreign Application Priority Data
Oct. 20, 2006    (JP) .................. 2006-286561

(51) Int. Cl.
*H01B 7/00* (2006.01)
(52) U.S. Cl. ............... 174/120 R; 174/120 SC
(58) Field of Classification Search .......... 174/110 R, 174/110 AR, 110 SR, 110 PM, 110 FC, 120 R, 174/120 C, 120 SC; 526/89, 206, 247, 254
See application file for complete search history.

(56) References Cited

U.S. PATENT DOCUMENTS

| | | | |
|---|---|---|---|
| 5,397,829 A | 3/1995 | Morgan et al. | |
| 5,986,150 A * | 11/1999 | Araki et al. | 568/843 |
| 6,541,588 B1 | 4/2003 | Kaulbach et al. | |
| 6,703,464 B2 | 3/2004 | Kono et al. | |
| 6,743,508 B2 | 6/2004 | Kono et al. | |
| 6,998,454 B2 * | 2/2006 | Taira et al. | 526/247 |
| 7,105,619 B2 * | 9/2006 | Kono et al. | 526/247 |
| 2003/0130459 A1 | 7/2003 | Kaulbach et al. | |
| 2003/0220458 A1 * | 11/2003 | Taira et al. | 526/253 |
| 2004/0242771 A1 * | 12/2004 | Kubo et al. | 525/55 |
| 2005/0049375 A1 * | 3/2005 | Kono et al. | 526/247 |

FOREIGN PATENT DOCUMENTS

| | | |
|---|---|---|
| EP | 1262496 A1 | 12/2002 |
| JP | 10-017621 A | 1/1998 |
| JP | 10017621 A | 1/1998 |
| JP | 10-513497 A | 12/1998 |
| JP | 2001-055418 A | 2/2001 |
| JP | 2002-535456 A | 10/2002 |
| JP | 2005-320497 A | 11/2005 |
| WO | 9405712 A1 | 3/1994 |
| WO | 9624625 A2 | 8/1996 |
| WO | 00/44797 A1 | 8/2000 |
| WO | 01/36504 A1 | 5/2001 |

* cited by examiner

*Primary Examiner* — William Mayo, III
(74) *Attorney, Agent, or Firm* — Sughrue Mion, PLLC (57) ABSTRACT

A fluorocopolymer having tetrafluoroethylene [TFE]-derived copolymerized units and hexafluoropropylene [HFP]-derived copolymerized units, which has the following characteristics (a) and (b): (a) a thermal melting curve obtained by primary heating in differential scanning calorimetry shows a melting point within the range of 240 to 280° C. and a melting point peak portion area accounts for at least 60% of heats of fusion area; and (b) the product of a MFR (g/10 minutes) and a resin pressure (MPa) is not larger than 40.

10 Claims, 1 Drawing Sheet

FLUORINE-CONTAINING COPOLYMER AND MOLDED ARTICLE

TECHNICAL FIELD

The present invention relates to a fluorocopolymer and a molded article made of the same.

BACKGROUND ART

Fluoropolymers are excellent in flame retardancy, non-stickiness and electrical insulating properties, among others, and therefore have so far been utilized as moldings or covering materials in various fields such as the chemical industry and machine industry.

In recent years, the use of tetrafluoroethylene [TFE]/hexafluoropropylene [HFP] copolymers and TFE/HFP/perfluoro(alkyl vinyl ether) copolymers as covering materials in electric wire jackets and LAN cables has been proposed; for use as electric wire coverings, however, such copolymers are required to be capable of being extrusion-molded at a high speed in electric wire covering.

Known as fluoropolymers capable of being extrusion-molded at a high speed are, for example:

TFE/HFP copolymers which are essentially composed of 78 to 95% by weight of TFE monomer units, 5 to 22% by weight of HFP monomer units and at most 3% by weight of units derived from a fluoromonomer copolymerizable with TFE and HFP, show a molecular weight distribution within a specified range, contain less than 80 unstable terminal groups per $1 \times 10^6$ carbon atoms and can be obtained by aqueous emulsion polymerization (cf. e.g. Patent Document 1);

Fluorocopolymers which comprise constituent units derived from TFE and HFP and at least one of specified perfluoro (alkyl vinyl ether) species in a content ratio of 75 to 92:8 to 20:0 to 5 by weight, have a melt flow rate (372° C., 5000 g load) within the range of 10 to 35 (g/10 minutes) and show a die swell within the range of 5 to 20% (cf. e.g. Patent Document 2);

Fluorocopolymers which are obtained by polymerization of TFE and HFP, if desired together with a perfluoro (vinyl ether) as a monomer, with the weight ratio among the respective monomer contents being 70 to 95:5 to 20:0 to 10, and which have a melt flow rate of 30 g (g/10 minutes) or higher, a volatile matter content of not higher than 0.2% by weight and a stress relaxation modulus within a specified range (cf. e.g. Patent Document 3);

FEP pellets with a volatile matter content not exceeding 0.2 weight % which, when used to form an insulating layer over a core wire by extrusion coating at a coating speed of 2800 ft/minute, meet the following requirements: (i) an adhesive strength between the insulating material and the core wire of 0.8 kg or more and (ii) an average number of cone-breaks in the insulating layer of one or less per 50,000 ft of the coated core wire (cf. e.g. Patent Document 4); and Fluoropolymers which are composed of 78 to 95 mass % of TFE and 5 to 22 weight % of HFP, optionally together with up to 3 mol % of a third monomer or monomers copolymerizable with TFE and HFP, and have a ratio of weight average molecular weight to number average molecular weight of less than 2 and a melt flow index of not lower than 15 (cf. e.g. Patent Document 5).

Patent Document 1: International Publication WO 00/44797
Patent Document 2: International Publication WO 01/36504
Patent Document 3: U.S. Pat. No. 6,703,464
Patent Document 4: U.S. Pat. No. 6,743,508
Patent Document 5: U.S. Pat. No. 6,541,588

DISCLOSURE OF INVENTION

Problems which the Invention is to Solve

FEPs, when used in high-speed extrusion molding, may cause fluctuations in wire diameter since the covering outside diameter cannot remain constant but fluctuates then. In proportion to the recent trends toward increased data transmission speeds and larger volume information transmission, the frequencies of electric signals are becoming higher. In the case of high frequency electric signal transmission, the use of electric wires fluctuating in wire diameter raises a problem; namely, attenuation readily occurs due to impedance dispersion and return loss, among others.

In view of the above-discussed state of the art, it is an object of the present invention to provide a fluorocopolymer capable of giving electric wires excellent in electric characteristics even when it is used in high-speed electric wire covering molding.

Means for Solving the Problems

The present invention is a fluorocopolymer comprising tetrafluoroethylene [TFE]-derived copolymerized units and hexafluoropropylene [HFP]-derived copolymerized units, which has a following characteristics (a) and (b).
(a) A thermal melting curve obtained by primary heating in differential scanning calorimetry shows a melting point within the range of 240 to 280° C. and a melting point peak portion area accounts for at least 60% of heats of fusion area.
(b) The product of a MFR (g/10 minutes) and a resin pressure (MPa) is not larger than 40.

The present invention is a molded article obtained by molding the fluorocopolymer mentioned above.

The present invention is an electric wire covered with the fluorocopolymer mentioned above, which having a conductor diameter of 0.2 to 1.0 mm.

The present invention is a method of producing electric wire, which comprises covering a core wire with the fluorocopolymer mentioned above at an electric wire covering speed of 1000 to 3000 feet/minute.

In the following, the invention is described in detail.

The fluorocopolymer of the invention has the following characteristics (a) and (b).
(a) The thermal melting curve obtained by primary heating in differential scanning calorimetry shows a melting point within the range of 240 to 280° C. and the melting point peak portion area accounts for at least 60% of the heats of fusion area.
(b) The product of the MFR (g/10 minutes) and the resin pressure (MPa) is not larger than 40.

The MFR mentioned above indicates the amount of the fluorocopolymer extruded at a predetermined pressure, and the resin pressure mentioned above indicates the pressure of the resin on the occasion of extrusion of a predetermined amount of the fluorocopolymer.

For obtaining moldings by extrusion molding without allowing fluctuations in thickness, it is important to reduce the fluctuations of resin discharge amounts as far as possible. Furthermore, in the case of high-speed extrusion molding, the amount of the resin discharged per unit time becomes large and the extrusion pressure increases and readily fluctuates and, therefore, fluctuations in thickness readily occur. As for the resin to be molded, the extrusion pressure tends to increase with the decrease in MFR value and, when comparison is made on the same MFR value level, the fluctuations in extrusion pressure tend to decrease with the decrease in resin pressure. Therefore, for obtaining a fluorocopolymer causing only small fluctuations in wire diameter even in high-speed extrusion molding, it is important to attain a proper balance between the MFR value and the resin pressure.

The fluorocopolymer of the invention, with which the temperature range occupied by the melting point peak on the thermal melting curve mentioned above is narrow, as indicated above under (a), melts uniformly upon heating and causes only slight fluctuations of resin discharge amounts on the occasion of molding. Furthermore, the fluorocopolymer mentioned above, with which the product of MFR and resin pressure is within a specified range, as indicated above under (b), can be used in high-speed extrusion molding at a moderate extrusion pressure, and a resin discharge amounts suited for electric wire covering can be attained stably and, therefore, the copolymer can be molded to give covered electric wires showing small fluctuations in wire diameter.

The fluorocopolymer of the invention shows a melting point within the range of 240 to 280° C. upon primary heating in differential scanning calorimetry, as mentioned above. When the melting point is lower than 240° C., the problem of insufficiency of thermal stability, in particular of thermal stability of electric wire covering moldings, may arise and, when it is higher than 280° C., covering extrusion molding tends to become difficult.

A preferred lower limit to the melting point mentioned above is 245° C., a more preferred lower limit thereto is 250° C., a preferred upper limit thereto is 275° C., and a more preferred upper limit thereto is 270° C.

The phrase "primary heating in differential scanning calorimetry" as used herein means that the measurement sample itself is melted but does not mean that the sample once melted and cooled on the differential scanning calorimeter is again heated. The measurement sample form includes, but is not limited to, pellets, powders, etc. The melting point mentioned above is defined as the temperature (b in [FIG. 1]) at which the thermal melting curve measured using 10±2 mg of the sample and using a differential scanning calorimeter (product of Seiko Denshi) at a programming rate of 10° C./minute shows the maximum endothermic peak value in the melting point peak range.

The fluorocopolymer of the invention shows, on the thermal melting curve mentioned above, a melting point peak portion area accounts for at least 60% of the heats of fusion area.

The above-mentioned fluorocopolymer shows a thermal melting curve with the melting point peak portion area of which is within the range mentioned above and therefore can be melted uniformly on the occasion of extrusion molding.

The melting point peak portion area preferably accounts for at least 65%, more preferably at least 68%, of the heats of fusion area from the viewpoint of reducing the fluctuations (variations) in extrusion pressure.

The term "heats of fusion area" as used herein refers to the region surrounded by the thermal melting curve in the temperature range of 205 to 280° C. and the line connecting the points corresponding to 205° C. and 280° C. on the thermal melting curve ([FIG. 1], region surrounded by straight line AB and curve) and the "melting point peak portion area" refers to the area of that region of the heats of fusion area which is within the temperature range of melting point±10° C. ([FIG. 1], slanting line region).

Figure 1:
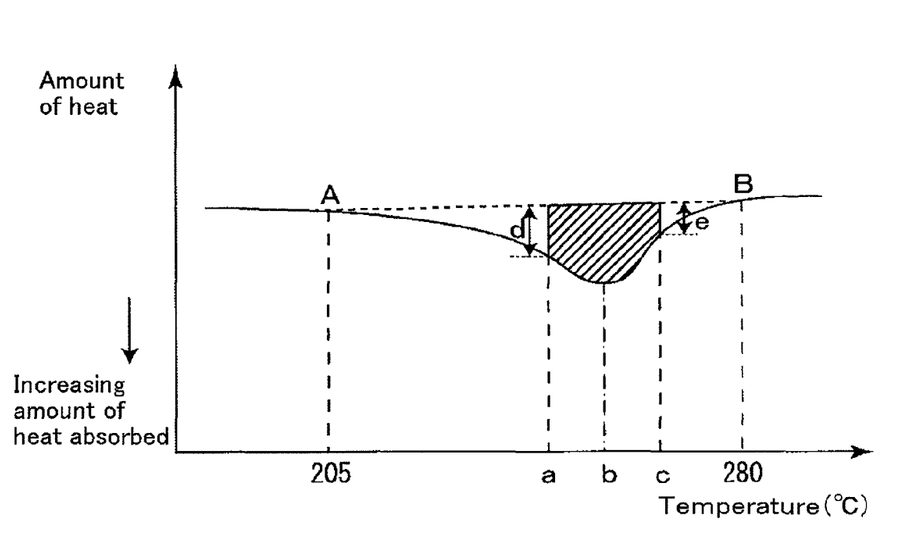
[FIG. 1] The FIGURE is an illustration of the heats of fusion area and the melting point peak portion area on a thermal melting curve. The solid line curve AB is the thermal melting curve.

The above-mentioned melting point peak portion area and heats of fusion area on the thermal melting curve can be determined by integrating the amounts of heat at the respective temperatures ([FIG. 1], differences between straight line AB and curve).

The fluorocopolymer of the invention shows, in addition to the above characteristics (a), the characteristic (b) that the product of the MFR (g/10 minutes) and the resin pressure (MPa) is not larger than 40.

From the viewpoint of lowering the extrusion pressure, a preferred upper limit to the above-mentioned product of the MFR and the resin pressure is 37 and a more preferred upper limit thereto is 35 and, within the above range, the product may be 20 or more.

The fluorocopolymer of the invention preferably has an MFR (g/10 minutes) of 10 to 40.

From the viewpoint of facilitating high-speed molding, a more preferred lower limit to the above MFR (g/10 minutes) is 20 and, from the viewpoint of improving the physical properties of the product electric wires, a more preferred upper limit thereto is 35.

The MFR so referred to herein is measured according to ASTM D 1238-98 by placing about 6 g of FEP under a load of 5 kg at 372° C. using a melt index tester (product of Kayeness, Series 4000).

In the practice of the invention, the resin pressure mentioned above is preferably 0.1 to 4 MPa. A more preferred lower limit to the resin pressure is 0.5 MPa and a more preferred upper limit thereto is 2 MPa.

The resin pressure so referred to herein is measured by introducing about 50 g of the fluorocopolymer into a cylinder (15 mm in inside diameter) maintained at 385±0.5° C., allowing the sample to stand in that condition for 10 minutes, then extruding the sample through an orifice having a diameter of 2 mm and a length of 20 mm at a shear rate of 36.5 (1/s) and measuring the resin pressure on that occasion using a capillary rheometer (product of Bohlin Instruments Limited, Rosand capillary rheometer).

The fluorocopolymer of the invention comprises tetrafluoroethylene [TFE]-derived copolymerized units and hexafluoropropylene [HFP]-derived copolymerized units.

The fluorocopolymer of the invention may further comprise, in addition of TFE-derived copolymerized units (hereinafter referred to as "TFE units") and HFP-derived copolymerized units (hereinafter referred to as "HFP units"), one or more other copolymerized unit species.

The monomer constituting the "other copolymerized units" is not particularly restricted but may be any monomer copolymerizable with TFE and HFP; thus, for example, there may be mentioned perfluoro(vinyl ether) species [PFVEs], chlorotrifluoroethylene [CTFE], trifluoroethylene, vinylidene fluoride [VdF] and like fluorinated monomers as well as ethylene [Et], propylene and like nonfluorinated monomers.

Preferred as the monomer constituting the "other copolymerized units" are PFVEs; preferred as the PFVEs are perfluoro(alkyl vinyl ether) species [PAVEs].

As the PAVES, there may be mentioned perfluoro(methyl vinyl ether) [PMVE], perfluoro(ethyl vinyl ether) [PEVE] and perfluoro(propyl vinyl ether) [PPVE] and, among them, PPVE is preferred.

The fluorocopolymer of the invention is preferably a TFE/HFP copolymer or a copolymer comprising TFE units, HFP units and PFVE-derived copolymerized units (hereinafter referred to as "PFVE units"), more preferably a TFE/HFP/PFVE copolymer, still more preferably a TFE/HFP/PPVE copolymer.

In the practice of the invention, the copolymer comprising TFE units, HFP units and PFVE units may further comprise, in addition to TFE units, HFP units and PFVE units, copolymerized units derived from at least one other monomer.

In the above-mentioned copolymer comprising TFE units, HFP units and PFVE units, the other monomer is not particularly restricted but may be anyone copolymerizable with TFE, HFP and PFVEs, and the other monomer can be appropriately selected.

From the thermal stability viewpoint and from the facilitated high-speed extrusion molding viewpoint, the mass percentages of TFE units and HFP units in the fluorocopolymer of the invention are preferably TFE units: HFP units (% by mass)=(80 to 95):(5 to 20), more preferably TFE units:HFP units=(84 to 92):(8 to 16).

When the fluorocopolymer comprises TFE units, HFP units and PFVE units, the proportions of the respective copolymerized units are preferably TFE units:HFP units: PFVE units (% by mass)=(70 to 95):(4 to 20): (0.1 to 10), more preferably TFE units:HFP units:PFVE units=(81 to 92):(7 to 16):(0.3 to 3).

In the present specification, the above-mentioned mass proportions are the values determined by $^{19}$F-NMR spectrometry using a NMR spectrometer (product of Bruker BioSpin).

The fluorocopolymer of the invention is preferably a terminally fluorinated copolymer. Fluorinated copolymer termini are excellent in thermal stability, are hardly decomposed upon heating, and hardly react with other terminal groups. Therefore, when the fluorocopolymer is a product of fluorination of copolymer termini, even the heating on the occasion of extrusion molding thereof will not cause foaming thereof nor bond formation between copolymer molecules, as described later herein, hence the formation of copolymer molecules particularly increased in molecular weight as compared with other ordinary copolymer molecules can be avoided; thus, the fluorocopolymer can retain the above-mentioned characteristics (a) and (b) even after extrusion molding. Therefore, when the fluorocopolymer fluorinated at copolymer termini is used, the variations in resin pressure can be suppressed even on the occasion of extrusion molding, hence covered moldings showing smaller fluctuations in wire diameter can be obtained.

The total number of —COF groups, —COOH groups, —CH$_2$OH groups, —CONH$_2$ groups, —COOCH$_3$ groups and —CF$_2$H groups (these terminal groups are sometimes referred to herein as "unstable terminal groups" or "terminal groups other than —CF$_3$ groups") contained in the fluorocopolymer of the invention is preferably not larger than 50 per $10^6$ main chain carbon atoms.

The above-mentioned —COF groups, —COOH groups, —CH$_2$OH groups, —CONH$_2$ groups and —COOCH$_3$ groups are thermally unstable and may cause foaming on the occasion of extrusion molding while —CF$_2$H groups may be bound to terminal groups of other molecular chains on the occasion of extrusion molding to form copolymer molecules approximately doubled in molecular chain length as compared with other ordinary copolymer molecules.

From the viewpoint of obtaining covered moldings showing smaller fluctuations in wire diameter, a more preferred upper limit to the number of the above-mentioned terminal groups is 30, a still more preferred upper limit thereto is 20, per $10^6$ main chain carbon atoms.

The number of the above terminal groups is determined by infrared absorption spectrophotometry using a model 1760X FT-IR spectrometer (product of Perkin Elmer).

The fluorocopolymer of the invention may have any form and may occur as a dispersion, a powder or pellets, for instance; the pellet form is preferred, however. The above-mentioned fluorocopolymer preferably shows both the characteristics (a) and (b) at the time when it is subjected to molding such as extrusion molding.

The fluorocopolymer of the invention can be prepared by carrying out the polymerization reaction using TFE and HFP, if desired together with one or more monomers other than TFE and HFP, if necessary followed by after-treatment, for example concentration.

The above polymerization reaction is not particularly restricted but mention may be made of emulsion polymerization, suspension polymerization, solution polymerization and gas phase polymerization, for example.

Preferred as the polymerization method are emulsion polymerization and suspension polymerization; for obtaining a copolymer uniform in composition, suspension polymerization is more preferred.

The polymerization reaction mentioned above can be carried out by adding one or more additives such as a polymerization initiator and a chain transfer agent, each in an appropriate amount, in addition to the monomers mentioned above.

For obtaining a fluorocopolymer meeting the characteristics requirements (a) and (b) mentioned above in the above polymerization reaction, it is preferred that the reaction conditions be properly adjusted so that a copolymer uniform in composition may be obtained. That the composition is uniform leads to the realization of a narrow melting point distribution.

Further, for obtaining a fluorocopolymer meeting the above-mentioned characteristics requirements (a) and (b), the reaction conditions can be properly adjusted considering also the following as indicators, among others: that the degree of branching is low, that the side chain distribution is uniform, that the molecular weight is uniform, and that the content of impurities, inclusive of additives, is low. That the degree of branching is low, that the side chain distribution is uniform, that the molecular weight is uniform and that the content of impurities, inclusive of additives, is low lead to the realization of stable resin flow characteristics.

Thus, a resin meeting the characteristics requirements (a) and (b) can be obtained by selecting the reaction conditions under which the copolymerized state of each resin molecule becomes uniform over the whole molecular chain and stable resin flow characteristics are realized.

As the means for obtaining such a copolymer as mentioned above, there may be mentioned, for example, (1) the method comprising uniformly maintaining the abundance ratio of the monomers in the monomer mixture subjected to polymerization from the initial stage of the reaction to the time of completion of the reaction by reducing the polymerization pressure stepwise during the polymerization reaction, for instance, and (2) the method comprising continuously or intermittently adding a polymerization initiator, a chain transfer agent, etc. during the polymerization reaction while varying the levels of addition thereof.

In carrying out the above method (1), the manner of reducing the polymerization pressure is not particularly restricted but the polymerization pressure is preferably lowered to 75 to 95% of the pressure at the start of polymerization.

In carrying out the above method (2), the manner of varying the levels of addition of additives is not particularly restricted but, when the polymerization initiator addition level is varied, the addition level is preferably changed to a level corresponding to 20 to 100% by mass of the addition level at the start of polymerization.

In preparing the fluorocopolymer by suspension polymerization, a diacyl peroxide is preferably used as the polymerization initiator.

As the diacyl peroxide, there may be mentioned, for example, hydrocarbon-based compounds represented by the formula: $(RCOO)_2$ (in which R represents a hydrocarbon group containing 1 to 10 carbon atoms) and fluorinated compounds represented by the formula: $(R_fCOO)_2$ (in which $R_f$ represents a perfluoroalkyl group containing 1 to 10 carbon atoms, an ω-hydroperfluoroalkyl group containing 1 to 10 carbon atoms or a chloroperfluoroalkyl group containing 1 to 10 carbon atoms).

The group R in the above hydrocarbon-based compounds is, for example, a n-propyl group or an isopropyl group.

The group $R_f$ in the above fluorinated compounds is, for example, an ω-hydrodecafluoroheptanoyl group.

In fluorocopolymer preparation by suspension polymerization using di-(ω-hydrodecafluoroheptanoyl) peroxide as a polymerization initiator, the supplemental addition of the polymerization initiator in the form of a solution in perfluorohexane during the polymerization reaction results in the addition of the partial pressure of perfluorohexane, hence in an increase in the proportion of TFE in HFP serving as a solvent; thus, the proportions of the respective monomers to be subjected to reaction vary, so that a copolymer uniform in composition may not be obtained. Therefore, in the case of adding di-(ω-hydrodecafluoroheptanoyl) peroxide dissolved in perfluorohexane as a polymerization initiator during the polymerization reaction, the level of supplemental addition of TFE is reduced in response to the addition of the initiator to thereby reduce the reaction system inside pressure and thus adjust the proportions of the respective monomers so that they may remain constant; in this way, the composition of the copolymer obtained can be rendered uniform.

A fluorocopolymer less branched and uniform in molecular weight can be obtained by adding an appropriate amount of a chain transfer agent in fluorocopolymer preparation by suspension polymerization.

As the chain transfer agent, there may be mentioned, for example, chain transfer agents comprising an alkane such as ethane, an isoparaffin, carbon tetrachloride, diethyl malonate, a mercaptan, diethyl ether and/or an alcohol such as methanol.

In producing the fluorocopolymer of the invention by emulsion polymerization, a water-soluble peroxide such as ammonium persulfate or potassium persulfate is preferably added as a polymerization initiator.

In the above emulsion polymerization, the polymerization initiator is generally added at the initial reaction stage to initiate the polymerization reaction. Since, however, it is consumed or decomposed with the progress of the reaction, it is preferably supplemented continuously in amounts corresponding to the amounts consumed or decomposed. Further, in the case of emulsion polymerization, the monomer composition in each micelle, which is the polymerization field, varies with the progress of the reaction under the influence of the copolymer formed; therefore, it is preferred that the monomer proportions be maintained constant by adjusting the polymerization pressure.

When, in the above emulsion polymerization, the polymerization initiator is supplemented continuously and, at the same time, the polymerization pressure is lowered in response to the progress of the polymerization reaction, the proportions of the monomers to be subjected to reaction can be maintained constant, so that a fluorocopolymer uniform in composition and capable of uniformly melting on the occasion of extrusion molding can be obtained.

The fluorocopolymer obtained by the above-mentioned method of polymerization, for example by emulsion polymerization or suspension polymerization, can be pelletized in the conventional manner. The pellet-shaped resin form is preferred in carrying out extrusion molding. Resin pellets for extrusion molding which show the characteristics (a) and (b) mentioned hereinabove also constitute an aspect of the present invention.

The resin pellets for extrusion molding according to the present invention can be obtained, for example, by subjecting the reaction mixture obtained after the above-mentioned polymerization to proper after-treatment steps, such as the steps of concentration and purification, and then coagulating and drying the polymer, followed by heating. The concentration and other steps each can be carried out in the conventional manner under conditions known in the art.

The fluorocopolymer of the invention is preferably one obtained by fluorination of copolymer termini, as mentioned hereinabove.

The fluorination can be carried out in the conventional manner, for example bringing the fluorocopolymer into contact with a fluorinating agent at a predetermined temperature.

As the fluorinating agent, there may be mentioned $F_2$, $NF_3$, $SF_4$, $PF_5$ and $IF_5$, among others.

The fluorocopolymer of the invention shows good thermal stability, chemical resistance, solvent resistance, insulating properties and electrical characteristics and therefore can be used for the manufacture of various molded articles, for example covering material of electric wires, foamed electric wires, cables, wires and the like, as well as tubes, films, sheets, filaments and so forth.

The molded articles obtained by molding the fluorocopolymer of the invention also constitute an aspect of the present invention.

The fluorocopolymer of the invention, which has the characteristics mentioned above and, in addition, when subjected to high-speed extrusion, hardly gives defective moldings and can be molded into extrusion-molded articles showing small fluctuations in wire diameter, can be suitably used in covering or coating electric wires by extrusion molding.

The high-speed extrusion molding can be carried out, for example, at an electric wire covering speed of 1000 to 3000 feet/minute.

A method of electric wire production which comprises covering a core wire with the above-mentioned fluorocopolymer at an electric wire covering speed of 1000 to 3000 feet/minute also constitutes an aspect of the present invention.

An electric wire with a conductor diameter of 0.2 to 1.0 mm as covered with the fluorocopolymer of the invention further constitutes an aspect of the present invention.

The electric wire of the invention, which is covered with the above-mentioned fluorocopolymer of the invention, is uniform in wire diameter and excellent in electrical characteristics in spite of the wire diameter thereof being small; it hardly causes attenuation even in the case of high-frequency electric signal transmission.

As the core wire in the above-mentioned electric wire, there may be mentioned, for example, copper wires, silver-plated wires and nickel-plated wires.

In the above-mentioned electric wire, the covering thickness may be 100 to 400 μm.

The above electric wire is a thin one, as mentioned above, and is also suited for use as an electric wire constituting a UTP table.

EFFECTS OF THE INVENTION

The fluorocopolymer of the invention, which has the constitution described hereinabove, is excellent in thermal stability and other properties and therefore is useful as a material for various molded articles; even on the occasion of high-speed extrusion molding, it causes only small fluctuations in wire diameter and can be molded to give electric wires excellent in electrical characteristics.

BEST MODES FOR CARRYING OUT THE INVENTION

The following examples and comparative examples illustrate the invention in further detail. These examples and comparative examples are, however, by no means limitative of the scope of the invention.

The composition-related amounts shown in the examples and comparative examples are given on the mass basis, unless otherwise specified.

1. Copolymer Composition

The composition was determined by $^{19}$F-NMR spectrum measurement using a NMR spectrometer (product of Bruker BioSpin, AC300 high-temperature prog).

2. MFR

The MFR was measured using a melt index tester (product of Kayeness, Series 4000) in accordance with ASTM D 1238-98; thus, about 6 g of FEP was tested at a temperature of 372° C. under a load of 5 kg (sum of piston and weight) using a die with a diameter of 2.1 mm and a length of 8 mm.

3. Melting Point

On the thermal melting curve obtained by measurement of 10±2 mg of the sample using a differential scanning calorimeter (product of Seiko Denshi) at a programming rate of 10° C./minute, the temperature showing the maximum endothermic peak value in the melting point peak range was regarded as the melting point.

4. Resin Pressure

The resin pressure was measured by introducing about 50 g of the fluorocopolymer into a cylinder (15 mm in inside diameter) maintained at 385±0.5° C., allowing the sample to stand in that condition for 10 minutes, then extruding the sample through an orifice having a diameter of 2 mm (error not greater than 0.002 mm) and a length of 20 mm (error not greater than 0.015 mm) at a shear rate of 36.5 (1/s) and measuring the resin pressure on that occasion using a capillary rheometer (product of Bohlin Instruments Limited, Rosand capillary rheometer).

5. Heats of Fusion Area and Melting Point Peak Portion Area on Thermal Melting Curve The areas were determined by integrating, on the thermal melting curve obtained by the above melting point determination, the amounts of heat at the respective temperatures ([FIG. 1], differences between straight line AB and curve) shown in the regions surrounded by the thermal melting curve and the line connecting the points corresponding to 205° C. and 280° C. on the thermal melting curve.

6. Number of Terminal Groups

The number was determined by carrying out infrared absorption spectrophotometry using a model 1760X FT-IR spectrometer (product of Perkin Elmer) and making calculations by the method described in U.S. Pat. No. 3,085,083 and Japanese Kokai Publication 2005-298659.

7. Electric Wire Covering Molding Conditions (1) Core wire: annealed copper wire AWG 24 (American Wire Gauge), core wire diameter 20.1 mils (about 0.5 mm)
(2) Covering thickness: 7.2 mils (about 180 μm)
(3) Covered electric wire diameter: 34.5 mils (about 0.9 mm)
(4) Wire take-off speed: 1800 feet/minute (about 550 m/minute)
(5) Melt molding (extrusion) conditions
Cylinder shaft diameter=2 inches (about 50 mm)
Single-screw extrusion molding machine with L/D=30
Die (inside diameter)/tip (outside diameter)=8.71 mm/4.75 mm
Extruder temperatures as set: barrel zone Z1 (338° C.), barrel zone Z2 (360° C.), barrel zone Z3 (371° C.), barrel zone Z4 (382° C.), barrel zone Z5 (399° C.), clamp section (404° C.), adapter section (404° C.), crosshead section (404° C.), die section (404° C.); preliminary core wire heating at 140° C.
Melt cone length in molding=3.7 to 4.0 mm 8. Wire Diameter Stability Measurement Outside diameter (OD) measurement were carried out for 20 hours using ODAC 15XY (product of Zumbach), an outside diameter measuring apparatus, and the stability in question was calculated in terms of process capability index [Cp]. Thus, the upper wire diameter limit (USL) was set at a level higher by 0.5 mil than the covered electric wire diameter 35.1 mils and the lower wire diameter limit (LSL) at a level lower by 0.5 mil than the covered electric wire diameter using USYS 2000 (Zumbach) and the Cp was analyzed from the outside diameter data obtained.

9. Capacitance Stability Measurement

Capacitance measurement was carried out for 20 hours using a capacitance measuring apparatus, Capac HS (type: MR20. 50HS, product of Zumbach), and the stability in question was calculated in terms of process capability index [Cp]. For analyzing the Cp, data were successively stored in USYS 2000 (product of Zumbach); the upper limit (USL) was set at +1.0 (pf/inch) and the lower limit (LSL) at −1.0 (pf/inch).

EXAMPLE 1

A 1000-L glass-lined vertical autoclave equipped with a stirrer was charged with 270 kg of pure water and 0.1 kg of ammonium ω-hydroxyfluorocarboxylate and, after three repetitions of a procedure comprising nitrogen substitution and subsequent evacuation of the autoclave inside, was further charged, in an evacuated state, with 211 kg of monomeric hexafluoropropylene [HFP] and 2.66 kg of monomeric perfluoro(propyl vinyl ether) [PPVE].

Stirring was started, the polymerization vessel temperature was set at 28.0° C., and the pressure was raised to 0.89 MPaG by feeding monomeric tetrafluoroethylene [TFE]. Then, 3.8 kg of di-(ω-hydrodecafluoroheptanoyl) peroxide (hereinafter referred to as "DHP") diluted to about 8% by mass with perfluorohexane was fed into the autoclave, whereupon the reaction started immediately.

The autoclave inside pressure was maintained at 0.89 MPaG during the reaction by supplemental feeding of TFE, 0.73 kg of PPVE was additionally fed at each of the points of time corresponding to 20%, 40%, 60% and 80% consumptions of the total amount of TFE fed after the start of the reaction. DHP was additionally fed 3 hours and 8 hours after the start of the reaction each time in an amount of 3.8 kg, and DHP was further additionally fed 13 hours, 18 hours, 23 hours, 28 hours and 33 hours after the start of the reaction each time in an amount of 1.5 kg. Furthermore, the pressure was lowered by 0.02 MPa simultaneously with each additional feeding of DHP. After the lapse of 5 hours following the start of the reaction, 5 kg of methanol was added as a chain transfer agent.

After carrying out the reaction for 36 hours, the unreacted TFE and HFP monomers were discharged; a wet powder remained. Pure water was added to this wet powder and, after washing with stirring, the mixture was taken out of the autoclave, and the powder was dried at 150° C. for 24 hours; 340 kg of a FEP copolymer was obtained as a dry powder.

The above FEP copolymer powder was subjected to melt-pelletization at 360° C. using a single-screw extruder. The FEP copolymer obtained had a composition of TFE:HFP: PPVE (mass ratio)=87.3:11.7:1.0, a MFR of 25 (g/10 minutes), a melting point of 257° C. and a product of MFR and resin pressure of 34. In the thermal melting curve obtained by differential scanning calorimetry of the above FEP copolymer, the melting point peak portion area was 69% of the heats of fusion area.

Using the melt-pelletized FEP copolymer, high-speed electric wire covering molding was carried out. The electric wire obtained showed a wire diameter stability level (Cp value) of 1.7 and a capacitance stability level (Cp value) of 1.5 and the results of covering were thus found to be good.

EXAMPLE 2

The melt-pelletized FEP copolymer of Example 1 was exposed to fluorine gas diluted to 25% by mass with nitrogen at 180° C. for 12 hours for fluorination of termini thereof. The fluorinated FEP copolymer had a MFR of 26 (g/10 minutes) and a melting point of 257° C. and contained, as terminal groups other than —$CF_3$ groups, 13 —COF groups per $10^6$ carbon atoms and 4 —COOH groups per $10^6$ carbon atoms. Furthermore, high-speed electric wire covering was carried out using the fluorinated FEP copolymer. The electric wire obtained showed a wire diameter stability level (Cp value) of 1.8 and a capacitance stability level (Cp value) of 1.6 and the results of covering were thus found to be good.

EXAMPLE 3

A 1000-L glass-lined vertical autoclave equipped with a stirrer was charged with 270 kg of pure water and 0.1 kg of ammonium ω-hydroxyfluorocarboxylate and, after three repetitions of a procedure comprising nitrogen substitution and subsequent evacuation of the autoclave inside, was further charged, in an evacuated state, with 233 kg of monomeric HFP.

Stirring was started, the polymerization vessel temperature was set at 29.0° C., and the pressure was raised to 0.9 MPaG by feeding monomeric TFE. Then, 3.8 kg of DHP was fed into the autoclave, whereupon the reaction started immediately.

The autoclave inside pressure was maintained at 0.9 MPaG during the reaction by supplemental feeding of monomeric TFE. DHP was additionally fed 3 hours, 8 hours and 13 hours after the start of the reaction each time in an amount of 3.8 kg and DHP was further additionally fed 18 hours, 23 hours, 28 hours and 33 hours after the start of the reaction each time in an amount of 1.9 kg. Furthermore, the pressure was lowered by 0.02 MPa simultaneously with each additional feeding of DHP.

After the lapse of 5 hours following the start of the reaction, 1.7 kg of methanol was added as a chain transfer agent for molecular weight adjustment.

After carrying out the reaction for 40 hours, the unreacted TFE and HFP monomers were discharged; a wet powder remained. Pure water was added to this wet powder and, after washing with stirring, the mixture was taken out of the autoclave, and the powder was dried at 150° C. for 24 hours; 330 kg of a FEP copolymer was obtained as a dry powder.

The above FEP copolymer powder was subjected to melt-pelletization at 360° C. using a single-screw extruder. The FEP copolymer obtained had a composition of TFE:HFP (mass ratio)=86.8:13.2, a MFR of 18 (g/10 minutes), a melting point of 248° C. and a product of MFR and resin pressure of 35. In the thermal melting curve obtained by differential scanning calorimetry of the above FEP copolymer, the melting point peak portion area was 65% of the heats of fusion area.

Using the melt-pelletized FEP copolymer, high-speed electric wire covering molding was carried out. The electric wire obtained showed a wire diameter stability level (Cp value) of 1.6 and a capacitance stability level (Cp value) of 1.5 and the results of covering were thus found to be good.

EXAMPLE 4

The melt-pelletized FEP copolymer of Example 3 was exposed to fluorine gas diluted to 25% by mass with nitrogen at 180° C. for 12 hours for fluorination of termini thereof. The fluorinated FEP copolymer had a MFR of 19 (g/10 minutes) and a melting point of 248° C. and contained, as terminal groups other than —$CF_3$ groups, 23 —COF groups per $10^6$ carbon atoms and 10 —COOH groups per $10^6$ carbon atoms. Furthermore, high-speed electric wire covering was carried out using the fluorinated FEP copolymer. The electric wire obtained showed a wire diameter stability level (Cp value) of 1.7 and a capacitance stability level (Cp value) of 1.6 and the results of covering were thus found to be good.

EXAMPLE 5

The polymerization procedure of Example 3 was followed in the same manner except that the initial monomeric HFP feeding was followed by feeding of 2.48 kg of monomeric PPVE, that 0.73 kg of PPVE was additionally fed at each of the points of time corresponding to 20%, 40%, 60% and 80% consumptions of the total amount of TFE fed after the start of the reaction, that DHP was additionally fed 3 hours, 8 hours, 13 hours, 18 hours and 23 hours after the start of the reaction each time in an amount of 3.8 kg and that DHP was further additionally fed 28 hours and 33 hours after the start of the reaction each time in an amount of 1.5 kg.

The polymerization time was 38 hours. A FEP copolymer was obtained in a yield of 346 kg.

The above FEP copolymer powder was subjected to melt-pelletization at 360° C. using a single-screw extruder. The FEP copolymer obtained had a composition of TFE:HFP: PPVE (mass ratio)=86.0:13.0:1.0, a MFR of 32 (g/10 minutes), a melting point of 243° C. and a product of MFR and resin pressure of 38. In the thermal melting curve obtained by differential scanning calorimetry of the above FEP copolymer, the melting point peak portion area was 60% of the heats of fusion area.

Using the melt-pelletized FEP copolymer, high-speed electric wire covering molding was carried out. The electric wire obtained showed a wire diameter stability level (Cp value) of 1.5 and a capacitance stability level (Cp value) of 1.4 and the results of covering were thus found to be good.

EXAMPLE 6

The melt-pelletized FEP copolymer of Example 5 was exposed to fluorine gas diluted to 25% by mass with nitrogen at 180° C. for 12 hours for fluorination of termini thereof.

The fluorinated FEP copolymer had a MFR of 33 (g/10 minutes) and a melting point of 244° C. and contained, as terminal groups other than —$CF_3$ groups, 18 —COF groups per $10^6$ carbon atoms and 8 —COOH groups per $10^6$ carbon atoms. Furthermore, high-speed electric wire covering was carried out using the fluorinated FEP copolymer. The electric wire obtained showed a wire diameter stability level (Cp value) of 1.6 and a capacitance stability level (Cp value) of 1.5 and the results of covering were thus found to be good.

EXAMPLE 7

A 50-L horizontal stainless steel autoclave equipped with a stirrer and degassed in advance was charged with 30 kg of degassed distilled water and 8 kg of a 10% (by mass) aqueous solution of a fluorinated surfactant ($C_7F_{15}COONH_4$). Further, 5 kg of monomeric HFP (liquid) was fed and, then, a gaseous TFE-HFP monomer mixture (TFE:HFP=86:14 (mass ratio)) was fed with stirring and with gradual temperature raising until arrival at an autoclave inside pressure of 1.5 MPaG and a temperature of 95° C. The reaction was initiated by feeding 3.5 kg of an aqueous solution of ammonium persulfate (10% by mass) as a polymerization initiator. The above-mentioned monomer mixture was continuously fed to maintain 1.5 MPaG. After 30 minutes, the stirring was discontinued, the unreacted monomeric TFE and HFP were recovered and 31.4 kg of a FEP copolymer dispersion having a polymer solid concentration of 4.5% by mass was obtained. Hereinafter, this dispersion is referred to as "FEP copolymer seed-containing FEP copolymer dispersion".

A portion of the above dispersion was coagulated with nitric acid to give a white powder.

The FEP copolymer obtained had a composition of TFE:HFP (mass ratio)=86.0:14.0 and the MFR thereof was unmeasurable.

Then, a 50-L horizontal stainless steel autoclave equipped with a stirrer and degassed in advance was charged with 30 kg of degassed distilled water and 1 kg of the above-mentioned FEP copolymer seed-containing FEP copolymer dispersion. Further, 18.1 kg of monomeric HFP (liquid) was fed, 0.2 kg of PPVE ($CF_2$=$COCF_2CF_3$) was then fed and, thereafter, a gaseous TFE-HFP monomer mixture (TFE:HFP (mass ratio)=90:10) was fed with stirring and with gradual temperature raising until arrival at an autoclave inside pressure of 4.2 MPaG and a temperature of 95° C.

Then, the reaction was initiated by feeding 0.12 kg of an aqueous solution of ammonium persulfate (10% by mass). Immediately following the start of the reaction, an aqueous solution of ammonium persulfate (10% by mass) was fed continuously at a rate of 1.1 g/minute until the termination of the reaction. Further, from the start of the reaction, a gaseous TFE-HFP monomer mixture having the same composition as above was continuously fed so that the pressure that had decreased by 0.1 MPa from 4.2 MPaG at each of the points of time corresponding to 20%, 40%, 60% and 80% consumptions of the total gaseous TFE-HFP monomer mixture might be maintained at the respective prevailing levels, 20 g each of PPVE was fed at each of the time-points corresponding to 25%, 50% and 75% consumptions of the gaseous TFE-HFP monomer mixture fed and the polymerization reaction was continued until the polymer solid concentration had reached 20% by mass. The reaction time was 60 minutes. Thereafter, the unreacted TFE and HFP monomers were recovered and the dispersion was taken out and coagulated using nitric acid, whereby about 7.5 kg of a white powder was obtained.

The FEP copolymer obtained had a composition of TFE:HFP (mass ratio)=85.8:13.2:1.0 and a MFR of 34 (g/10 minutes).

Sodium carbonate ($Na_2CO_3$) was added to and uniformly dispersed in the above FEP copolymer powder to a final concentration of 30 ppm and the resulting mixture was subjected to melt-pelletization with simultaneous stabilization (wet heat treatment) on a twin-screw extruder (product of Japan Steel Works) under a temperature condition of 360° C. with feeding of water and air, whereby a melt-pelletized FEP copolymer (fluororesin composition) was obtained.

The FEP copolymer obtained had a MFR of 31 (g/10 minutes), a melting point of 244° C. and a product of MFR and resin pressure of 36. In the thermal melting curve obtained by differential scanning calorimetry of the above FEP copolymer, the melting point peak portion area was 62% of the heats of fusion area.

Using the above fluororesin composition, high-speed electric wire covering molding was carried out. The electric wire obtained showed a wire diameter stability level (Cp value) of 1.6 and a capacitance stability level (Cp value) of 1.4.

EXAMPLE 8

The fluororesin composition of Example 7 was exposed to fluorine gas diluted to 25% by mass with nitrogen at 180° C. for 12 hours for fluorination of termini thereof.

The fluorinated FEP copolymer had a MFR of 32 (g/10 minutes) and a melting point of 244° C. and contained no terminal groups other than —$CF_3$ groups. Furthermore, high-speed electric wire covering was carried out using the fluorinated FEP copolymer. The electric wire obtained showed a wire diameter stability level (Cp value) of 1.7 and a capacitance stability level (Cp value) of 1.5 and the results of covering were thus found to be good.

COMPARATIVE EXAMPLE 1

The polymerization procedure of Example 1 was followed in the same manner except that the pressure was not varied during the polymerization.

The polymerization time was 33 hours. A FEP copolymer (342 kg) was obtained.

The above FEP copolymer powder was subjected to melt-pelletization at 360° C. using a single-screw extruder. The FEP copolymer obtained had a composition of TFE:HFP:PPVE (mass ratio)=87.5:11.5:1.0, a MFR of 23 (g/10 minutes), a melting point of 259° C. and a product of MFR and resin pressure of 42. In the thermal melting curve obtained by differential scanning calorimetry of the above FEP copolymer, the melting point peak portion area was 62% of the heats of fusion area.

Using the melt-pelletized FEP copolymer, high-speed electric wire covering molding was carried out. The electric wire obtained showed a wire diameter stability level (Cp value) of 1.0 and a capacitance stability level (Cp value) of 0.8.

COMPARATIVE EXAMPLE 2

The polymerization procedure of Example 3 was followed in the same manner except that the pressure was not varied during the polymerization.

The polymerization time was 37 hours. A FEP copolymer (333 kg) was obtained.

The above FEP copolymer powder was subjected to melt-pelletization at 360° C. using a single-screw extruder. The FEP copolymer obtained had a composition of TFE:HFP (mass ratio)=87.0:13.0, a MFR of 16 (g/10 minutes), a melting point of 254° C. and a product of MFR and resin pressure of 38. In the thermal melting curve obtained by differential scanning calorimetry of the above FEP copolymer, the melting point peak portion area was 58% of the heats of fusion area.

Using the melt-pelletized FEP copolymer, high-speed electric wire covering molding was carried out. The electric wire obtained showed a wire diameter stability level (Cp value) of 0.9 and a capacitance stability level (Cp value) of 0.7.

COMPARATIVE EXAMPLE 3

The polymerization procedure of Example 3 was followed in the same manner except that the pressure was not varied during the polymerization and that 10 kg of methanol was fed 5 hours after the start of the reaction.

The polymerization time was 36 hours. A FEP copolymer (345 kg) was obtained.

The above FEP copolymer powder was subjected to melt-pelletization at 360° C. using a single-screw extruder. The FEP copolymer obtained had a composition of TFE:HFP (mass ratio)=86.2:13.8, a MFR of 22 (g/10 minutes), a melting point of 245° C. and a product of MFR and resin pressure of 42. In the thermal melting curve obtained by differential scanning calorimetry of the above FEP copolymer, the melting point peak portion area was 58% of the heats of fusion area. Using the melt-pelletized FEP copolymer, high-speed electric wire covering molding was carried out. The electric wire obtained showed a wire diameter stability level (Cp value) of 0.7 and a capacitance stability level (Cp value) of 0.6.

COMPARATIVE EXAMPLE 4

The polymerization procedure of Example 5 was followed in the same manner except that the pressure was not varied during the polymerization.

The polymerization time was 32 hours. A FEP copolymer (342 kg) was obtained.

The above FEP copolymer powder was subjected to melt-pelletization at 360° C. using a single-screw extruder. The FEP copolymer obtained had a composition of TFE:HFP:PPVE (mass ratio)=85.3:13.7:1.0, a MFR of 31 (g/10 minutes), a melting point of 241° C. and a product of MFR and resin pressure of 44. In the thermal melting curve obtained by differential scanning calorimetry of the above FEP copolymer, the melting point peak portion area was 57% of the heats of fusion area. Using the melt-pelletized FEP copolymer, high-speed electric wire covering molding was carried out. The electric wire obtained showed a wire diameter stability level (Cp value) of 0.7 and a capacitance stability level (Cp value) of 0.6.

COMPARATIVE EXAMPLE 5

The polymerization procedure of Example 7 was followed in the same manner except that the pressure was not varied during the polymerization.

The polymerization time was 65 minutes. A FEP copolymer (about 7.5 kg) was obtained.

The FEP copolymer obtained had a composition of TFE:HFP:PPVE (mass ratio)=85.8:13.2:1.0 and a MFR of 33 (g/10 minutes).

Sodium carbonate ($Na_2CO_3$) was added to and uniformly dispersed in the above FEP copolymer powder to a final concentration of 30 ppm and the resulting mixture was subjected to melt-pelletization with simultaneous stabilization (wet heat treatment) on a twin-screw extruder (product of Japan Steel Works) under a temperature condition of 360° C. with feeding of water and air, whereby a melt-pelletized FEP copolymer (fluororesin composition) was obtained.

The FEP copolymer obtained had a MFR of 33 (g/10 minutes), a melting point of 243° C. and a product of MFR and resin pressure of 32. In the thermal melting curve obtained by differential scanning calorimetry of the above FEP copolymer, the melting point peak portion area was 56% of the heats of fusion area.

Furthermore, using the above fluororesin composition, high-speed electric wire covering molding was carried out. The electric wire obtained showed a wire diameter stability level (Cp value) of 1.0 and a capacitance stability level (Cp value) of 0.8.

TABLE 1

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|---|---|---|
| Composition (mass proportion) | TFE (mass %) | 87.3 | 87.3 | 86.8 | 86.8 | 86.0 | 86.0 | 85.8 | 85.8 | 87.5 | 87.0 | 86.2 | 85.3 | 85.8 |
| | HFP (mass %) | 11.7 | 11.7 | 13.2 | 13.2 | 13.0 | 13.0 | 13.2 | 13.2 | 11.5 | 13.0 | 13.8 | 13.7 | 13.2 |
| | PPVE (mass %) | 1.0 | 1.0 | — | — | 1.0 | 1.0 | 1.0 | 1.0 | 1.0 | — | — | 1.0 | 1.0 |
| Melting point (° C.) | | 257 | 257 | 248 | 248 | 243 | 244 | 244 | 244 | 259 | 254 | 245 | 241 | 243 |
| MFR (g/10 min) | | 25 | 26 | 18 | 19 | 32 | 33 | 31 | 32 | 23 | 16 | 22 | 31 | 33 |
| Resin pressure (MPa) | | 1.35 | 1.32 | 1.92 | 1.86 | 1.18 | 1.15 | 1.16 | 1.12 | 1.84 | 2.36 | 1.92 | 1.42 | 0.98 |
| MFR × resin pressure | | 34 | 34 | 35 | 35 | 38 | 38 | 36 | 36 | 42 | 38 | 42 | 44 | 32 |
| Proportion of melting point peak area (%) | | 69 | 69 | 65 | 65 | 60 | 60 | 62 | 62 | 62 | 58 | 58 | 57 | 56 |
| Wire diameter stability | | 1.7 | 1.8 | 1.6 | 1.7 | 1.5 | 1.6 | 1.6 | 1.7 | 1.0 | 0.9 | 0.7 | 0.7 | 1.0 |
| Capacitance stability | | 1.5 | 1.6 | 1.5 | 1.6 | 1.4 | 1.5 | 1.4 | 1.5 | 0.8 | 0.7 | 0.6 | 0.6 | 0.8 |

INDUSTRIAL APPLICABILITY

The fluorocopolymer of the invention, which has the constitution described hereinabove, is excellent in thermal stability and other properties and is useful as a material of various molded articles; even when subjected to high-speed extrusion molding, in particular, it causes only small fluctuations in wire diameter and can be molded into electric wires excellent in electrical characteristics.

EXPLANATION OF SYMBOLS a (Melting point−10)° C.
b Melting point
c (Melting point+10)° C.
d Amount of heat at (melting point−10)° C.
e Amount of heat at (melting point+10)° C.

The invention claimed is:

1. A fluorocopolymer comprising tetrafluoroethylene [TFE]-derived copolymerized units and hexafluoropropylene [HFP]-derived copolymerized units, which has a following characteristics (a) and (b):
    (a) a thermal melting curve obtained by primary heating in differential scanning calorimetry shows a melting point within the range of 240 to 280° C. and a melting point peak portion area accounts for at least 60% of heats of fusion area; and
    (b) the product of a MFR (g/10 minutes) and a resin pressure (MPa) is not larger than 40, and
    wherein the number of —COF groups, —COOH groups, —CH$_2$OH groups, —CONH$_2$ groups, —COOCH$_3$ groups and —CF$_2$H groups in the fluorocopolymer is not larger than 50 per 10$^6$ main chain carbon atoms.

2. The fluorocopolymer according to claim 1, wherein the MFR (g/10 minutes) is 10 to 40.

3. The fluorocopolymer according to claim 1,
    wherein, on the thermal melting curve obtained by primary heating in differential scanning calorimetry, the melting point peak portion area accounts for at least 68% of the heats of fusion area.

4. The fluorocopolymer according to claim 1,
    which comprises [TFE]-derived copolymerized units, hexafluoropropylene [HFP]-derived copolymerized units and perfluoro(vinyl ether)-derived copolymerized units.

5. The fluorocopolymer according to claim 1,
    which is obtained by carrying out suspension polymerization.

6. The fluorocopolymer according to claim 1,
    wherein the perfluoro(vinyl ether) is perfluoro(propyl vinyl ether).

7. The fluorocopolymer according to claim 1,
    which is resin pellets for extrusion molding.

8. A molded article obtained by molding the fluorocopolymer according to claim 1.

9. An electric wire covered with a fluorocopolymer according to claim 1,
    which having a conductor diameter of 0.2 to 1.0 mm.

10. A method of producing electric wire,
    which comprises covering a core wire with the fluorocopolymer according to claim 1, at an electric wire covering speed of 1000 to 3000 feet/minute.

* * * * *